3,275,104
BRAKE CYLINDER ASSEMBLY WITH CONTINUOUSLY ACTING SLACK ADJUSTER
Joseph G. Stipanovic, McKeesport, and Francis R. Racki, Pittsburgh, Pa., assignors to Westinghouse Air Brake Company, Wilmerding, Pa., a corporation of Pennsylvania
Filed Sept. 29, 1964, Ser. No. 400,027
6 Claims. (Cl. 188—196)

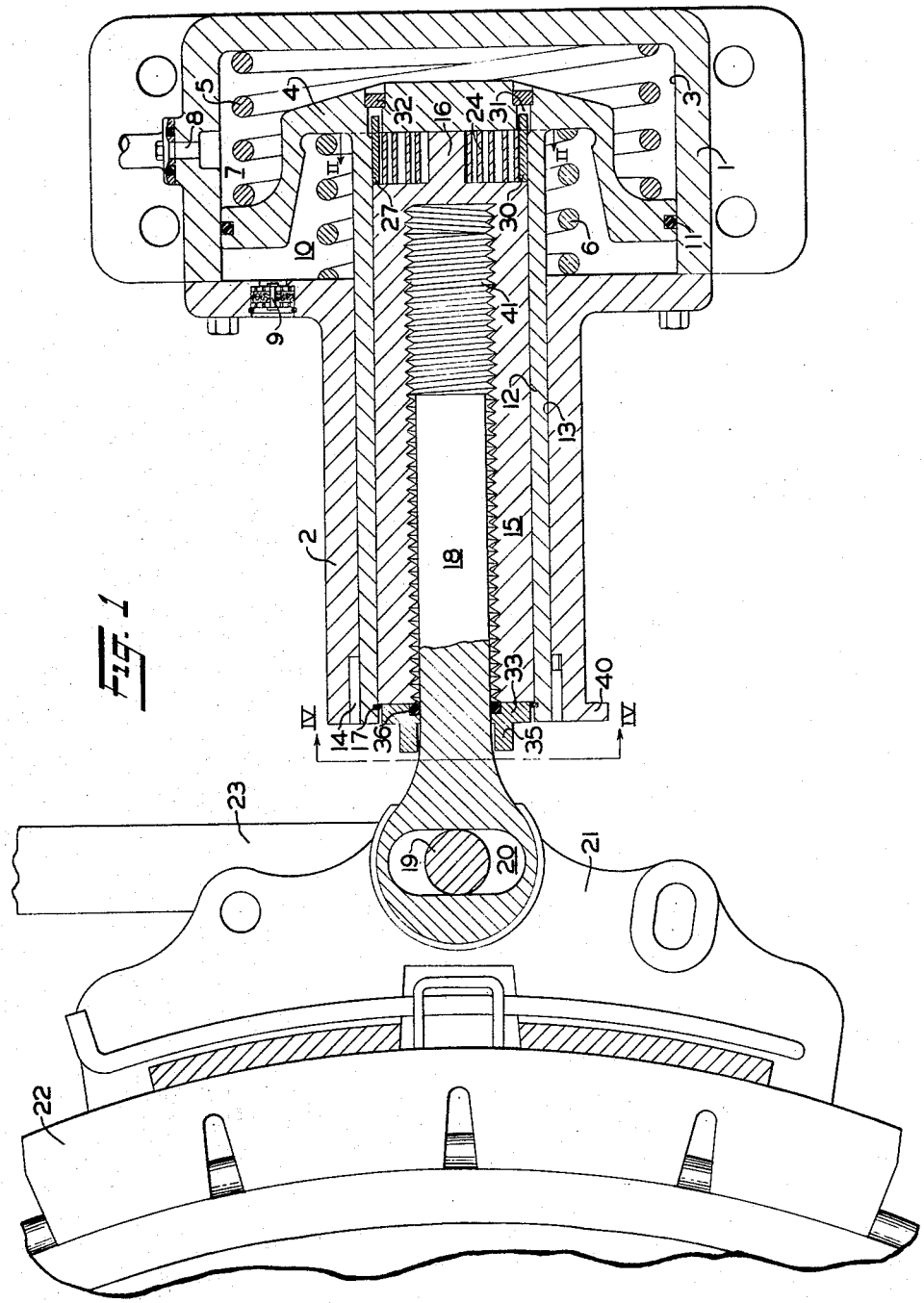

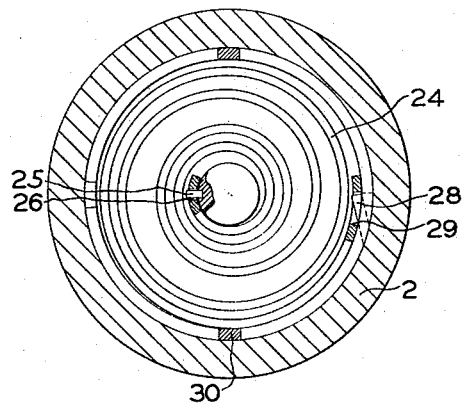
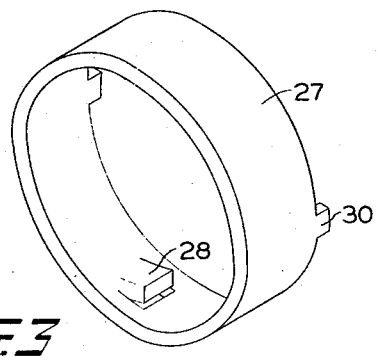
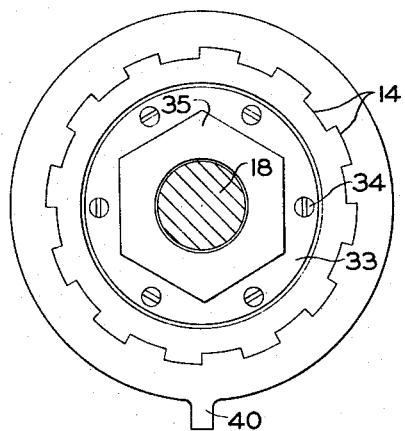
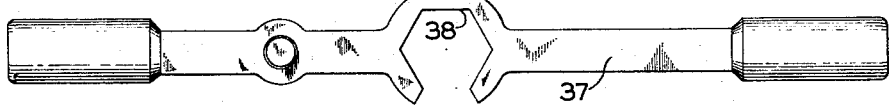
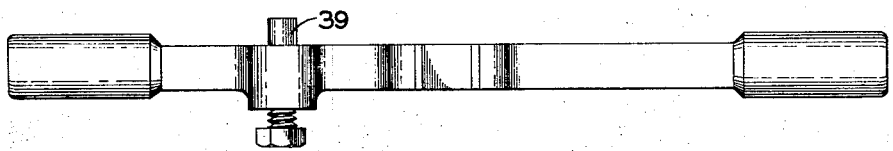
INVENTORS
JOSEPH G. STIPANOVIC
FRANCIS R. RACKI
BY
A.G. Steinmiller
ATTORNEY

United States Patent Office 3,275,104
Patented Sept. 27, 1966

This invention relates to a railway vehicle brake cylinder assembly with a continuously acting slack adjuster and, more particularly, to a brake cylinder assembly having incorporated therein an automatic, continuously acting slack adjuster which functions both to take up slack and to maintain light frictional contact between the brake shoe and wheel surface to prevent the accumulation of ice and snow thereon.

It is a principal object of this invention to provide an improved brake cylinder device in which is incorporated a new and improved automatic slack adjuster which is simple in design and economical to manufacture.

The present invention comprises a brake cylinder device having a piston with a hollow stem in which an internally threaded sleeve is rotatable, said sleeve having a push rod threadedly engaged therein for effecting application of braking forces to a suitable brake application means, such as a brake shoe. A spiral spring is anchored at its inner end to the inner closed end of the rotatable sleeve, and its outer end to the hollow piston stem. Once the spring is wound up, it exerts a torque on the sleeve, tending to rotate it within the hollow stem. The push rod is thus continuously urged axially through the threaded connection with the sleeve in a brake applying direction to maintain light frictional contact between the brake shoe and wheel tread. Fluid pressure supplied to a chamber at one side of the piston is effective to exert a braking force via the piston stem, the sleeve and the push rod interlocked by the self-locking threaded connection therebetween, to apply the customary braking forces to the brake shoe.

The light continuous frictional contact of the brake shoe on the wheel tread generates sufficient heat to prevent the accumulation of ice and snow thereon. Also, since the usual clearance between brake shoe and wheel tread is eliminated, brake cylinder piston travel is reduced to a minimum, allowing a shorter length brake cylinder to be employed, and causing an over-all reduction in both the time of brake application and the amount of fluid under pressure used therein.

Other features and advantages of this invention will be apparent from the following detailed description, when taken together with the accompanying drawings, of which:

FIG. 1 is a view of a brake assembly, showing in vertical section a brake cylinder device having slack adjusting means embodied therein in accordance with the present invention.

FIG. 2 is a sectional view, slightly enlarged, taken along the line II—II of FIG. 1;

FIG. 3 is an isometric view of the main barrel by which the spiral spring is secured within the hollow stem of the brake cylinder piston;

FIG. 4 is a sectional view, slightly enlarged, taken along the line IV—IV of FIG. 1; and FIG. 5 shows two views of a wrench employed for winding up the spiral spring.

Referring now to the drawings, the present invention comprises a brake cylinder having a piston section 1 and a section 2, of reduced diameter, suitably joined together. Cylinder section 1 has a bore 3 in which a piston 4 is slidably operable in sealed relation. Piston 4 is normally biased to a certain position by the opposing forces of two springs, one of which is a spring 5 acting on the right-hand face of piston 4, as viewed in FIG. 1, hereinafter caller the pressure face, and the other of which is a return spring 6 acting on the left-hand face of piston 4, hereinafter called the non-pressure face. Fluid under pressure is supplied to and released from chamber 7 on the pressure side of the piston 4 via a port 8. A suitable atmospheric vent port, in which is disposed a suitable strainer 9, provides breathing action for a chamber 10 on the non-pressure side of piston 4. Piston 4 has a suitable O-ring seal 11 to provide a seal with bore 3 in cylinder section 1.

Extending coaxially from the non-pressure face of piston 4 is a hollow cylindrical piston stem 12 which is slidably operable within a bore 13 of cylinder section 2, while being secured against rotation relative to said section by a tongue and groove or spline arrangement 14 (see FIG. 4) located in the left end, as viewed in FIG. 1, of the mating surfaces of section 2 and stem 12.

An internally threaded sleeve 15 is rotatable inside the smooth internal bore of stem 12. The inner or right-hand end of sleeve 15 is closed and has an axially projecting lug 16 which abuts piston 4. The outer or left-hand end of the sleeve 15 is secured longitudinally within stem 12 by means of a snap ring 17 engaging an annular groove in stem 12. Sleeve 15 screw threadedly receives therein one end of a push rod 18, the other end of which is suitably connected by a pin 19 extending through a slot 20 in the enlarged end of the push rod to a brake application means, such as a brake head 21 and brake shoe 22 attached thereto. A brake hanger 23, pivotally connected by the pin 19 to the brake head, illustratively shown to provide additional support for the brake head and shoe, in a well-known manner.

A spiral spring 24 is anchored at its inner end to lug 16 by a pin 25 (FIG. 2) which passes through a slot 26 adjacent the inner end of spring 24. The spiral spring 24 is initially assembled slightly pre-wound, in a main barrel 27 (see also FIG. 3), and is secured to said main barrel by a tab 28 (FIG. 3) which engages a slot 29 (FIG. 2) in the outer end of spring 24.

Main barrel 27 has two laterally extending diametrically disposed tabs 30 (FIG. 3) which fit into respective holes 31 drilled in piston 4, thereby securing said main barrel to piston 4. The above-mentioned holes are countersunk to enable suitable sealing plugs 32 to be secured therein to prevent the leakage of fluid under pressure from chamber 7 through the piston.

A wrench plate 33 is secured to the left end of sleeve 15, as viewed in FIG. 1, by a series of cap screws 34 (FIG. 4). A portion 35 of plate 33 extends outward and is of polygonal shape, for application of a wrench thereto, in a manner hereinafter described. Push rod 18 has a smooth surface except for a threaded portion on the end received in sleeve 15, and a suitable O-ring 36 provides a seal with push rod 18, thus preventing the entrance of dirt and other particles into the mechanism.

A spanner wrench 37 (FIG. 5), having an open jaw portion 38 which fits on portion 35 on plate 33, facilitates winding or rewinding of spiral spring 24. A pin 39 is screw-thread fitted in wrench 37 in such a manner that a forward adjustment of said pin will cause it to extend past a tab 40 on section 2, thereby locking the wrench against counter-rotation by the force of spiral spring 24, as more fully explained hereinafter.

*Operation*

Assuming the railway vehicle to be in motion with no fluid under pressure supplied to chamber 7 of the brake cylinder, brake cylinder piston 4 is in its normal position in which it is shown in FIG. 1. Let it also be assumed that spiral spring 24 has been "wound up" and thus, in its wound state, exerts a continuous and more or less uniform torque on sleeve 15, which, being rotatable and urged to rotate, transmits an axial force on push rod 18 through the nut-and-screw relation therewith, thereby causing the brake shoe 22 to be maintained in light frictional contact with the wheel tread surface, as shown in FIG. 1, in effect generating sufficient heat to prevent the accumulation of ice and snow thereon.

With the brake shoe 22 in continuous contact with the tread surface of the associated wheel, any irregularity on the tread surface of the car wheels, or any unevenness or discontinuity in the track, will be transmitted to the brake shoe and transduced to axial movement in piston stem 12 and piston 4. Spring 5 therefore serves to cushion slight movements of the piston and stem in the right-hand direction and thus prevent the piston 4 from hammering the end wall of cylinder section 2. Spring 5 is of such strength as to balance piston 4 normally in its release position against the combined force of return spring 6 and the reaction to the axial force produced by spiral spring 24, as described above.

When a brake application is initiated by supplying fluid under pressure to chamber 7 of the brake cylinder, the fluid pressure exerts a force on piston 4 and thus on sleeve 15 which, via the lug 16, abuts piston 4. The pitch of the screw threads 41 on push rod 18 is such as to form a locked relationship against rotation of the sleeve 15 under the heavy axial compressive forces produced during pneumatic pressure braking. Thus, the axial force on sleeve 15 is carried through push rod 18 to brake head 21 and brake shoe 22, which thus exerts a braking effect corresponding to the fluid pressure acting on piston 4 in chamber 7.

Let it now be assumed that during a prolonged pneumatic brake application the surface of brake shoe 22 wears down somewhat. In consequence of the wear on the brake shoe, piston 4 moves in a brake applying direction under the fluid pressure in chamber 7 so that the braking force of the brake shoe against the car wheel remains essentially the same.

Assuming sufficient wear on the brake shoe 22 during a prolonged brake application or a series of brake applications, the release of fluid under pressure from chamber 7 of the brake cylinder will result in restoration of piston 4 to its normal release position. However, as clearance between the brake shoe and wheel tread tends to develop due to brake shoe wear, the torque exerted by spiral spring 24 on sleeve 15 causes the sleeve to rotate so as to cause the push rod 18 to screw outwardly of the sleeve sufficiently to maintain the brake shoe in contact with the wheel tread surface, thus taking up the slack which would otherwise result.

When a worn brake shoe needs to be replaced, the open jaw portion 38 of wrench 37 is placed around portion 35 of plate 33 and turned by hand in a direction to rotate sleeve 15 in a corresponding direction so as to rewind spiral spring 24 which has been unwinding during the taking up of slack caused by brake shoe wear. The rotation of sleeve 15 causes push rod 18 to screw back therein, thereby establishing sufficient clearance between the wheel tread and brake shoe 22 to allow for the removal of the worn shoe and installation of a new one. When such clearance is established, pin 39 in wrench 37 is screwed inward so as to project axially and engage tab 40 on section 2 to hold the wrench against the countertorque exerted by spiral spring 24. After the worn shoe is replaced, wrench 37 is held until pin 39 is unscrewed. Wrench 37 is then allowed to turn slowly with manual restraint under the torque of spring 24 until the new brake shoe comes into contact with the wheel tread, at which time the wrench is removed from nut 35 of wrench plate 33.

Having now described the invention, what we claim as new and desire to secure by Letters Patent, is:

1. A brake cylinder assembly comprising:
   (a) a casing,
   (b) a piston slidably operable therein,
   (c) biasing means serving to bias said piston normally to a certain position and yieldingly permitting movement of said piston out of its normal position responsively to fluid pressure acting thereon one face thereof,
   (d) a hollow cylindrical piston stem extending coaxially from the face of said piston opposite to said one face of said piston,
   (e) a push rod for actuating a braking element, said rod having an externally screw-threaded portion,
   (f) a sleeve rotable in a fixed axial position in said stem and having an internally threaded bore into which said screw-threaded portion of said push rod screws, rotation of said sleeve in opposite directions causing axial projection or retraction of said push rod from or into the sleeve, and
   (g) means exerting a continuous torque in one direction on said sleeve to cause said push rod to constantly exert a light force on the braking element and effective to axially project said push rod with respect to said sleeve to take up slack as wear on the braking element occurs.

2. A brake cylinder assembly as claimed in claim 1, further characterized in that the cooperating threads of the threaded portions on said sleeve and said push rod are self-locking responsive to an axial force on said sleeve whereby said sleeve and push rod transmit a braking force developed by fluid pressure acting on said one face of said piston.

3. A brake cylinder assembly as claimed in claim 1, further characterized in that said means exerting a continuous torque on said sleeve comprises a spiral spring, one end of which is secured to said hollow piston stem and the other end of which is secured to said sleeve.

4. A brake cylinder assembly as claimed in claim 1, further characterized in that said biasing means comprises spring means in said casing acting in opposed relation on said piston.

5. A brake assembly comprising, in combination:
   (a) a braking element adapted to frictionally engage a rotatable member to be braked,
   (b) a brake cylinder having:
      (i) a casing,
      (ii) a piston slidably operable in said casing,
      (iii) a hollow cylindrical stem coaxially extending from one face of said piston and slidable within said casing,
      (iv) resilient means serving to bias said piston to a normal position in said casing and yieldingly permitting movement of said piston responsive to fluid pressure acting thereon,
      (v) a sleeve member rotatably mounted in said hollow cylindrical stem and having a threaded bore,
      (vi) a push rod having at one end an externally threaded portion which screws into the correspondingly threaded bore within said sleeve member and having at the opposite end a connection to said braking element, the cooperating threads of said push rod and sleeve member being self-locking responsive to axial force on said sleeve member,
      (vii) a spiral spring secured at its inner end to said sleeve member and at its outer end to said hollow cylindrical stem, said spiral spring exerting a continuous torque tending to rotate said sleeve member thereby exerting an axial force on said push rod in a direction to apply the braking element continuously with a relatively light force to the rotatable member to be braked, (viii) said piston when subject to fluid pressure exerting an axial force on said sleeve and, via the self-locking threads on said sleeve and push rod, on said push rod to correspondingly apply the braking element to the rotatable element to be braked.

6. A slack adjusting mechanism for a railway car brake cylinder having a casing, a piston operable in said casing, and a hollow coaxially extending piston stem, said slack adjusting mechanism comprising the combination of:

(a) a sleeve member rotatable in said piston stem,
(b) a push rod having screw-threaded connection to said sleeve and movable axially with respect to said sleeve member to take up or let out slack as rotation of said sleeve occurs in opposite directions, said screw-threaded connection being self-locking when force is exerted axially on said stem responsively to fluid pressure acting on said piston to apply a braking force, and
(c) a spiral spring secured at one end to said stem and at the other end to said sleeve, said spring exerting a continuous torque on said sleeve causing a continuously exerted axial force on said push rod in a brake applying direction so as to take up slack developed during braking, incidental to relief of fluid pressures from said piston.

References Cited by the Examiner
UNITED STATES PATENTS
2,196,799   4/1940   Keplinger _____ 188—79.5

References Cited by the Applicant
UNITED STATES PATENTS
2,974,757   3/1961   Polanin.
3,101,814   8/1963   Newell.

DUANE A. REGER, *Primary Examiner.*